(12) United States Patent
Laberge et al.

(10) Patent No.: US 11,404,174 B2
(45) Date of Patent: Aug. 2, 2022

(54) SYSTEM AND METHOD FOR GENERATING PLASMA AND SUSTAINING PLASMA MAGNETIC FIELD

(71) Applicant: General Fusion Inc., Richmond (CA)

(72) Inventors: Michel Georges Laberge, West Vancouver (CA); Kelly Bernard Epp, Langley (CA); Blake Kenton Rablah, North Vancouver (CA); Meritt Wayne Reynolds, New Westminster (CA); Alexander Douglas Mossman, Vancouver (CA); Stephen James Howard, Burnaby (CA)

(73) Assignee: General Fusion Inc., Burnaby (CA)

( * ) Notice: Subject to any disclaimer, the term of this patent is extended or adjusted under 35 U.S.C. 154(b) by 139 days.

(21) Appl. No.: 17/056,716

(22) PCT Filed: Feb. 28, 2018

(86) PCT No.: PCT/CA2018/050235
§ 371 (c)(1),
(2) Date: Nov. 18, 2020

(87) PCT Pub. No.: WO2019/165535
PCT Pub. Date: Sep. 6, 2019

(65) Prior Publication Data
US 2021/0217536 A1     Jul. 15, 2021

(51) Int. Cl.
*G21B 1/21*      (2006.01)
*G21B 1/05*      (2006.01)
(Continued)

(52) U.S. Cl.
CPC ............... *G21B 1/21* (2013.01); *G21B 1/05* (2013.01); *H05H 1/02* (2013.01); *H05H 1/04* (2013.01); *H05H 1/22* (2013.01); *H05H 1/36* (2013.01)

(58) Field of Classification Search
None
See application file for complete search history.

(56) References Cited

U.S. PATENT DOCUMENTS 4,544,394 A  * 10/1985  Hnat ....................... C03B 3/026
                                                             65/335
4,601,871 A  *  7/1986  Turner .................... H05H 1/16
                                                             376/128
(Continued)

FOREIGN PATENT DOCUMENTS

CA          2867362 A1      10/2013
CA           288371 A1       3/2014
(Continued)

OTHER PUBLICATIONS

International Search Report received in PCT Application No. PCT/CA2018/050235 dated Oct. 4, 2018 in 4 pages.
(Continued)

*Primary Examiner* — Srinivas Sathiraju
(74) *Attorney, Agent, or Firm* — Knobbe, Martens, Olson & Bear, LLP

(57) ABSTRACT

A system for generating magnetized plasma and sustaining plasma's magnetic field comprises a plasma generator for generating magnetized plasma and a flux conserver in which the generated magnetized plasma is injected and confined. A central conductor comprises an upper central conductor and a lower central conductor that are electrically connected forming a single integrated conductor. The upper central conductor and an outer electrode form an annular plasma propagating channel. The lower central conductor extends out of the plasma generator and into the flux conserver such that an end of the inner electrode is electrically connected to a wall of the flux conserver. A power system provides a formation current pulse and a sustainment current pulse to (Continued)

the central conductor to form the magnetized plasma, inject such plasma into the flux conserver and sustain plasma's magnetic field.

12 Claims, 8 Drawing Sheets

(51) Int. Cl.
| | |
|---|---|
| H05H 1/04 | (2006.01) |
| H05H 1/02 | (2006.01) |
| H05H 1/22 | (2006.01) |
| H05H 1/36 | (2006.01) |

(56) References Cited

U.S. PATENT DOCUMENTS

| | | | | |
|---|---|---|---|---|
| 4,641,060 A * | 2/1987 | Dandl | ............... | H01J 41/12 |
| | | | | 376/127 |
| 4,931,251 A | 6/1990 | Watanabe et al. | | |
| 5,147,596 A * | 9/1992 | Weil | ............... | G21B 1/052 |
| | | | | 376/134 |
| 6,396,213 B1 * | 5/2002 | Koloc | ............... | H05H 1/52 |
| | | | | 315/111.21 |
| 6,477,216 B2 * | 11/2002 | Koloc | ............... | H05H 1/04 |
| | | | | 376/124 |
| 8,279,994 B2 * | 10/2012 | Kotschenreuther | ...... | G21B 1/01 |
| | | | | 376/173 |
| 8,537,958 B2 * | 9/2013 | Laberge | ............... | G21B 3/008 |
| | | | | 376/121 |
| 8,891,719 B2 * | 11/2014 | Howard | ............... | G21B 3/006 |
| | | | | 376/150 |
| 9,267,515 B2 * | 2/2016 | Suponitsky | ............... | H05H 1/24 |
| 9,462,669 B2 * | 10/2016 | Prater | ............... | H05H 1/16 |
| 9,596,745 B2 * | 3/2017 | Laberge | ............... | H05H 1/105 |
| 9,706,633 B2 | 7/2017 | Asai et al. | | |
| 9,754,686 B2 * | 9/2017 | Jarboe | ............... | G21B 1/17 |
| 9,875,816 B2 * | 1/2018 | Laberge | ............... | G21B 3/008 |
| 9,967,963 B2 * | 5/2018 | Zindler | ............... | G21B 1/21 |
| 10,049,774 B2 * | 8/2018 | Tuszewski | ............... | H05H 1/10 |
| 10,217,532 B2 * | 2/2019 | Binderbauer | ............ | H05H 1/54 |
| 10,546,660 B2 * | 1/2020 | Laberge | ............... | F15D 1/0095 |
| 10,665,351 B2 * | 5/2020 | Binderbauer | ............ | H05H 1/54 |
| 10,811,144 B2 * | 10/2020 | Laberge | ............... | G21B 1/057 |
| 10,984,917 B2 * | 4/2021 | Laberge | ............... | H05H 1/54 |
| 11,013,100 B2 * | 5/2021 | Hidding | ............... | H05H 1/46 |
| 11,107,592 B2 * | 8/2021 | Prater | ............... | G21B 1/057 |
| 11,200,990 B2 * | 12/2021 | Binderbauer | ............ | H05H 1/54 |
| 11,217,351 B2 * | 1/2022 | Gonzalez | ............... | G21B 1/13 |
| 2001/0046273 A1 * | 11/2001 | Koloc | ............... | H05H 1/04 |
| | | | | 376/121 |
| 2006/0198483 A1 | 9/2006 | Laberge | | |
| 2010/0074809 A1 * | 3/2010 | Poltoratsky | ............... | G21D 7/00 |
| | | | | 422/186.04 |
| 2011/0026657 A1 * | 2/2011 | Laberge | ............... | H05H 1/16 |
| | | | | 376/133 |
| 2011/0026658 A1 * | 2/2011 | Howard | ............... | H05H 1/02 |
| | | | | 376/133 |
| 2011/0142185 A1 | 6/2011 | Woodruff | | |
| 2014/0247913 A1 * | 9/2014 | Laberge | ............... | H05H 3/06 |
| | | | | 376/133 |
| 2016/0314855 A1 * | 10/2016 | Laberge | ............... | G21B 1/057 |
| 2018/0190390 A1 * | 7/2018 | Laberge | ............... | G21B 1/057 |
| 2019/0139650 A1 * | 5/2019 | Laberge | ............... | G21B 1/21 |
| 2020/0236770 A1 * | 7/2020 | Zimmermann | ......... | H05H 1/24 |

FOREIGN PATENT DOCUMENTS

| | | | | |
|---|---|---|---|---|
| CA | 2917195 A1 | 1/2015 | | |
| CA | 2883710 | 7/2017 | | |
| CN | 104508922 A | 10/2016 | | |
| CN | 106664788 A | 1/2019 | | |
| EP | 2834525 A1 | 7/2017 | | |
| JP | S61274292 | 4/1985 | | |
| JP | 2012-517085 A | 12/2012 | | |
| JP | 2017-512315 A | 5/2017 | | |
| JP | 2015-532769 A | 7/2017 | | |
| RU | 2273118 C2 | 3/2006 | | |
| RU | 2602716 C2 | 11/2016 | | |
| WO | WO-2005001845 A2 * | 1/2005 | ............ | G21B 1/23 |
| WO | WO 2010/089670 A1 | 8/2010 | | |
| WO | WO 2016/026040 A1 | 2/2016 | | |
| WO | WO-2020237380 A1 * | 12/2020 | ............ | H05H 1/12 |

OTHER PUBLICATIONS

Laberge, M., "An Acoustically Driven Magnetized Target Fusion Reactor," J. of Fusion, vol. 27, Issue 1-2, pp. 65-68 (2007).
Laberge, M., "Acoustically Driven Magnetized Target Fusion," IEEE Proceedings of SOFE, Jun. 14, 2013.
O'Shea, P. et al. "Acoustically Driven Magnetized Target Fusion at General Fusion: An Overview," APS DPP Conference, Nov. 5, 2016.
Written Opinion received in PCT Application No. PCT/CA2018/050235 dated Nov. 19, 2018 in 5 pages.
Wurden, G.A., et al., "Magneto-Inertial Fusion," J. of Fusion Energy, vol. 35, pp. 69-77 (2015).
Howard et al. "Physics Objectives of P13 Spherical Tokamak Program", Poster at the 59$^{th}$ Annual Meeting of the APS Division of Plasma Physics, Oct. 1, 2017.
Hooper et al., "Sustained Spheromak Physics Experiment (SSPK): design and physics results", Plasma Physics and Controlled Fusion, IOP, Bristol, GB, vol. 54, No. 11, Oct. 9, 2012.
Extended European Search Report (EESR) dated Dec. 12, 2021 issued by the European Patent Office.
Office Action issued by the Japanese Patent Office dated Dec. 17, 2021 and translation.
Office Action issue by Chinese Patent Office dated Feb. 23, 2022 and English summary.
Search Report issued by the Russian Patent Office dated Apr. 14, 2021.

* cited by examiner

SYSTEM AND METHOD FOR GENERATING PLASMA AND SUSTAINING PLASMA MAGNETIC FIELD

CROSS-REFERENCE TO RELATED APPLICATIONS

This application is a continuation-in-part of PCT International Application No. PCT/CA2018/050235, filed Feb. 28, 2018, designating the United States and published in English on Sep. 6, 2019 as WO2019/165535. The disclosure of the above-referenced application is hereby expressly incorporated by reference in its entirety.

TECHNICAL FIELD

The present disclosure relates generally to a system and method for generating magnetized plasma and particularly to a plasma generation system with a central conductor that is used in plasma formation and sustainment of plasma's magnetic field.

BACKGROUND

Unless otherwise indicated herein, the materials described in this section are not prior art to the claims in this application and are not admitted to be prior art by inclusion in this section.

Plasma is a state of matter similar to gas in which at least part of the particles are ionized. Plasma with a magnetic field strong enough to influence the motion of the charged particles is called magnetized plasma. The magnetic field within plasma can confine the plasma particles for an extended period of time if the magnetic field lines are configured to loop back on themselves in closed orbits (possibly infinite in length). The majority of the magnetic field in the magnetized plasma is created by currents flowing in the plasma itself and/or in a wall of a chamber containing the plasma. There are various methods and systems for generating high energy plasma. Generally, plasma can be generated by introducing a gas through one or more valves into a plasma generator between a pair of electrodes. A high voltage pulse is discharged between the electrodes to ionize the gas and form plasma. For the gas breakdown to occur, enough gas needs to be injected to fill the gap between the electrodes. The breakdown process involves acceleration of free electrons, colliding with neutral atoms and triggering an avalanche ionization process. In order to generate high voltage pulses between the electrodes, a discharge circuit is required to employ a fast switch or a system of multiple switches to rapidly deliver high energy current pulses from a capacitor bank (a high voltage pulsed power source) to the electrodes.

FIG. 1 shows a prior art system for generating magnetized plasma and sustaining plasma's magnetic field. The system comprises a plasma generator 12 and a flux conserving chamber 14 (also sometimes referred to as a flux conserver). The generator 12 is configured to generate a magnetized plasma and can have a central formation electrode 11 and an outer electrode 13 that is coaxial to and surrounds the formation electrode 11 thus forming an annular plasma propagating channel therein between. A series of magnetic coils 15 can be used to form an initial (stuffing) magnetic field in the plasma propagation channel. A gaseous plasma fuel is injected into the propagation channel through a number of valves 16. A formation current pulse is provided to the formation electrode 11 by a power source 17, so that a current of either polarity can flow across the gaseous plasma fuel injected into the propagation channel, between the formation electrode 11 and the outer electrode 13, ionizing the gaseous plasma fuel and forming plasma. This current can create a plasma toroidal magnetic field that can cause motion of the plasma toward the flux conserver 14. As the plasma moves forward, it interacts with the stuffing magnetic field, such that when the advancing plasma breaks free, the magnetic field wraps around the plasma forming the magnetized plasma toms. The system further comprises an elongated central axial shaft 18 that extends out of the generator 12 into the flux conserver 14 and which is electrically isolated from the formation electrode 11 by a gap 19. An additional current pulse is driven along the central axial shaft 18 and the wall of the flux conserver 14 in order to provide a toroidal magnetic field in the plasma generator 12 and the flux conserver 14 to sustain the plasma's magnetic field. The toroidal magnetic field generated in the flux conserver 14 can diffuse into the plasma to sustain the plasma's magnetic field and thus improve plasma confinement and increase plasma's life. As illustrated in FIG. 1, the shaft 18 is electrically isolated from the formation electrode 11 by the gap 19, so that a power source can provide a formation pulse to the formation electrode 11 and a sustainment pulse to the central shaft 18. In some implementations, an insulator can be provided between the formation electrode 11 and the central shaft 18, instead of the gap 19, to electrically insulate the central shaft 18 from the formation electrode 11. Having insulation between the formation electrode 11 and the central shaft 18 (whether it is a gap 19 or any other type of electrical insulation) may cause ejection of impurities into the plasma and/or damage (melting) of the electrode/shaft due to a current arching across the gap 19 or on a surface of the insulator.

SUMMARY

In one aspect a system for generating magnetized plasma and sustaining plasma's magnetic field is provided. The system comprises a plasma generator for generating the magnetized plasma. It comprises an outer electrode and an upper central conductor located coaxially within and spaced from the outer electrode to form an annular plasma propagation channel with an outlet. A fuel injector injects a plasma fuel into an upstream end of the annular plasma propagation channel. One or more coils are configured to generate a stuffing magnetic field in the annular plasma propagation channel and to provide a poloidal field for the magnetized plasma. A flux conserver is in fluid communication with the plasma generator. The flux conserver has an outer wall and a lower central conductor located coaxially within and spaced from the outer wall to define an evacuated inner cavity with an entrance that is in fluid communication with the outlet of the annual plasma propagation channel and through which the magnetized plasma generated in the plasma generator is injected into the inner cavity. One end of the lower central conductor is electrically coupled to one end of the upper central conductor and another end of the lower central conductor is electrically coupled to the outer wall of the flux conserver. A power supply source is electrically coupled to the upper and lower central conductors such that a current flows along the upper and lower central conductors and the outer wall of the flux conserver. The power supply source comprises a formation power circuit configured to generate a formation power pulse sufficient to generate the magnetized plasma from the plasma fuel in the plasma generator and to inject the magnetized plasma into the flux conserver, and a sustainment power circuit configured to generate a sustainment current pulse along the upper and lower central conductors and the outer wall of the flux conserver sufficient to generate a toroidal magnetic field in the plasma generator and the flux conserver.

In one aspect, the sustainment power circuit further comprises a buffer inductor that at least partially electrically isolates the sustainment power circuit from the formation power circuit. The system further comprises a controller programmed to trigger the sustainment power circuit before the formation power circuit to form a pre-existing toroidal field in the plasma generator and the flux conserver.

In one aspect at least one trigger electrode is provided. The at least one trigger electrode is electrically coupled to the formation power circuit such that the formation power circuit is operable to provide a breakdown current pulse to the trigger electrode sufficient to break down the plasma fuel to form the magnetized plasma. The formation power circuit comprises a main formation power circuit electrically coupled to the upper central conductor and operable to provide the formation current pulse, and a pre-formation power circuit electrically coupled to the trigger electrode and operable to provide the breakdown current pulse.

In another aspect the plasma fuel is a pre-ionized gas that is injected into the upstream end of the annular plasma propagation channel.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

Embodiments of the present invention disclose a system and method for generating magnetized plasma such as for example a plasma torus, from a plasma fuel, and sustaining the plasma's magnetic field using a single central conductor instead of the formation electrode 11 and central shaft 18 separated by the insulating gap 19 of the prior art system 10. When a current is provided to the central conductor, and because the central conductor is not electrically isolated from a flux conserver of the system, the system performs as an inductor and the current flows along the central conductor, a wall of the flux conserver and an outer electrode of the system. In order to ensure generation of magnetized plasma and to sustain the plasma's magnetic field, the current needs to flow radially across the plasma fuel to provide a breakdown discharge and formation of magnetized plasma. To ensure that magnetized plasma with desired parameters is formed and injected into the flux conserver, a formation power supply circuit can be provided comprising one or more fast switches that can provide a high voltage across a plasma propagation channel of the system for a sufficient time period to cause plasma fuel breakdown before the current loops around the flux conserver. Additionally or alternatively, one or more trigger electrodes can be used to cause plasma fuel breakdown. The plasma fuel can be a neutral gas or a pre-ionized gas.

Figure 1:
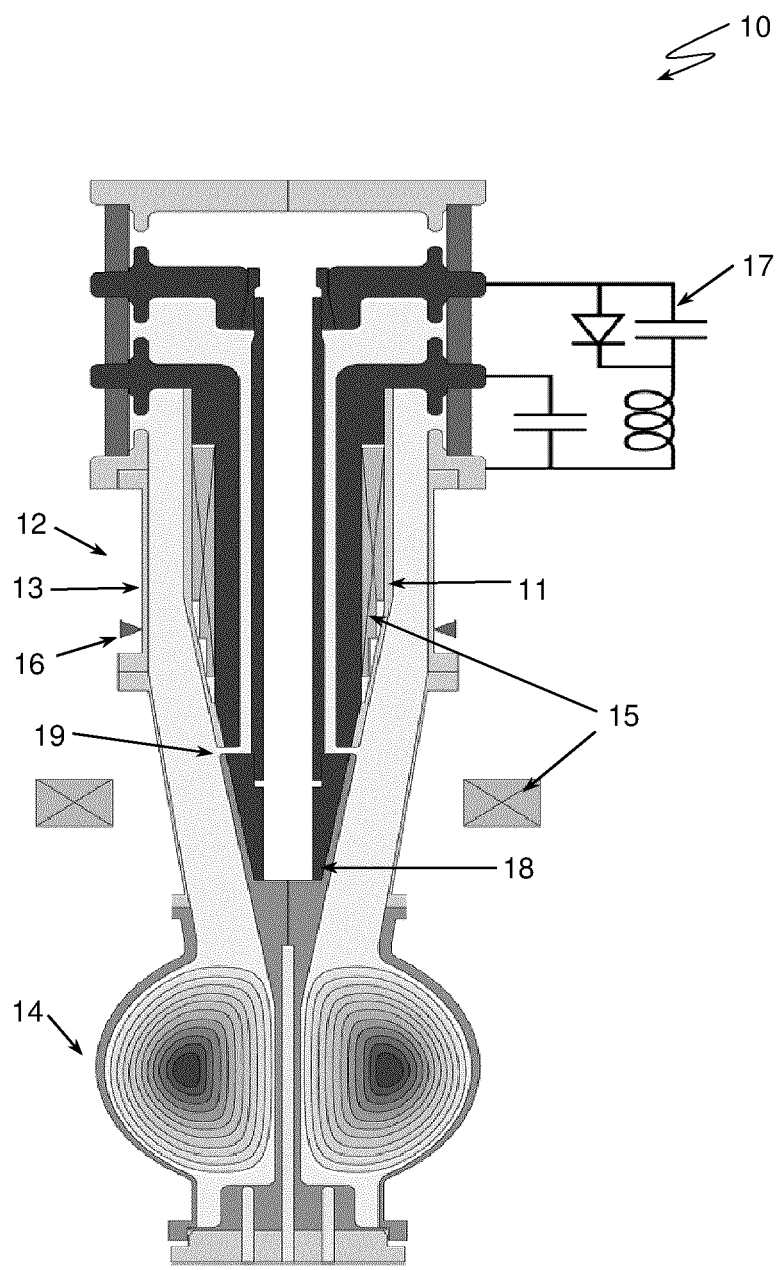
FIG. 1 is a cross-sectional schematic view of a known (prior art) system for generating plasma and sustaining plasma's magnetic field.
Figure 2:
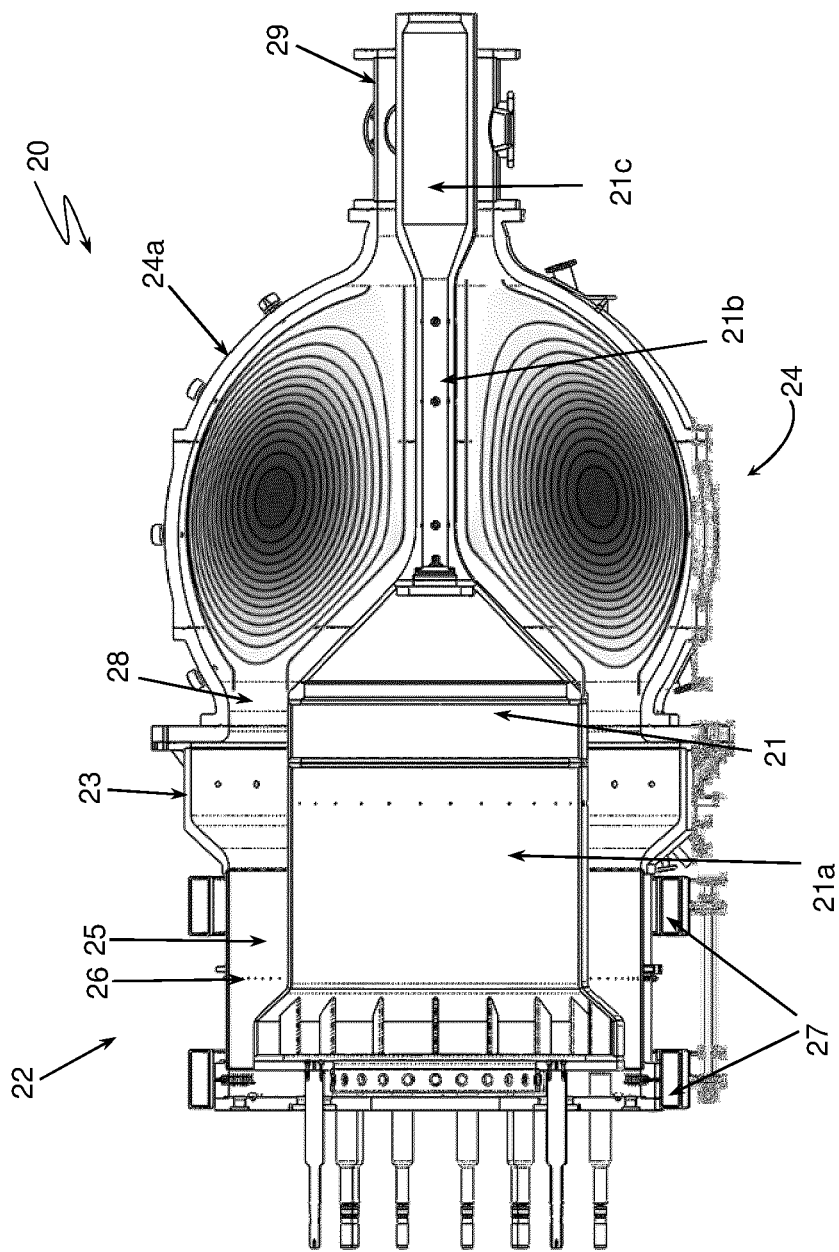
FIG. 2 is a cross-sectional schematic view of one example of a system for generating plasma and sustaining plasma's magnetic field according to the present invention.

FIG. 2 illustrates an example of a system 20 for generating magnetized plasma according to one embodiment of the present invention, which includes a plasma generator 22 and a flux conserver 24. The system 20 comprises a central conductor 21 and an outer electrode 23. The central conductor 21 comprises an upper central conductor 21a positioned within the plasma generator 22 and a lower central conductor 21b positioned within the flux conserver 24; a distal end 21c of the lower central conductor 21b is connected to an end plate 29 of the flux conserver 24. The upper central conductor 21a can have a cylindrical, a conical or a similar shape or combination thereof, while the lower central conductor 21b can have more of an elongated (shaft-like) shape extending centrally throughout the length of the flux conserver 24. This is intended to be illustrative and not limiting and the central conductor 21 and/or the outer electrode 23 can have any other suitable shape without departing from the scope of the invention. The outer electrode 23 is coaxial and surrounds the upper central conductor 21a thus defining an annular plasma propagation channel 25 therein between. A fuel injector having one or more valves 26 is also provided to inject a plasma fuel into an upstream end of the plasma propagation channel 25 of the plasma generator. The one or more gas valves 26 can be in fluid communication with the a plasma fuel source (not shown) and can be arranged as a ring around the periphery of the plasma generator 22 to symmetrically inject a precise quantity of plasma fuel into the channel 25 through ports 26a. The system 20 further comprises a power source 30 (see FIG. 3) to provide a formation current pulse and a toroidal field sustainment current pulse to the central conductor 21 to form a magnetized plasma in the plasma generator 22, inject such plasma into the flux conserver 24 and sustain the plasma's magnetic field in the flux conserver 24 for a prolonged time period.

The central conductor 21 is made from a conductive and high-vacuum-compatible material and is configured to form the magnetized plasma and sustain plasma's magnetic field for a prolonged time. As described herein below, this can be done by either using one or more fast formation switches (e.g. rail gap switches) that can provide a high voltage across the plasma propagation channel 25 for a sufficient time period to cause plasma fuel breakdown and ionization before the current loops around the flux conserver 25; and/or by employing one or more trigger electrodes for the gas breakdown, and/or using a pre-ionized gas as a plasma fuel.

In one implementation, the lower central conductor 21b of the central conductor 21 can be a liquid metal guide comprising a flowing liquid metal. For example, the upper central conductor 21a of the central conductor 21 can comprise a liquid metal reservoir that contains the liquid metal, which flows out through an outlet formed in the liquid metal reservoir. The liquid metal can flow through the flux conserver 24 and can be collected in a catcher (not shown) that can be positioned, for example, within the end plate 29. The liquid metal from the catcher can be recirculated back into the liquid metal reservoir using one or more pumps. The liquid metal guide can flow continuously or the flow can be regulated using a valve that is in communication with the reservoir's outlet. The liquid metal can flow under gravity or by using pressure means.

Figure 2A:
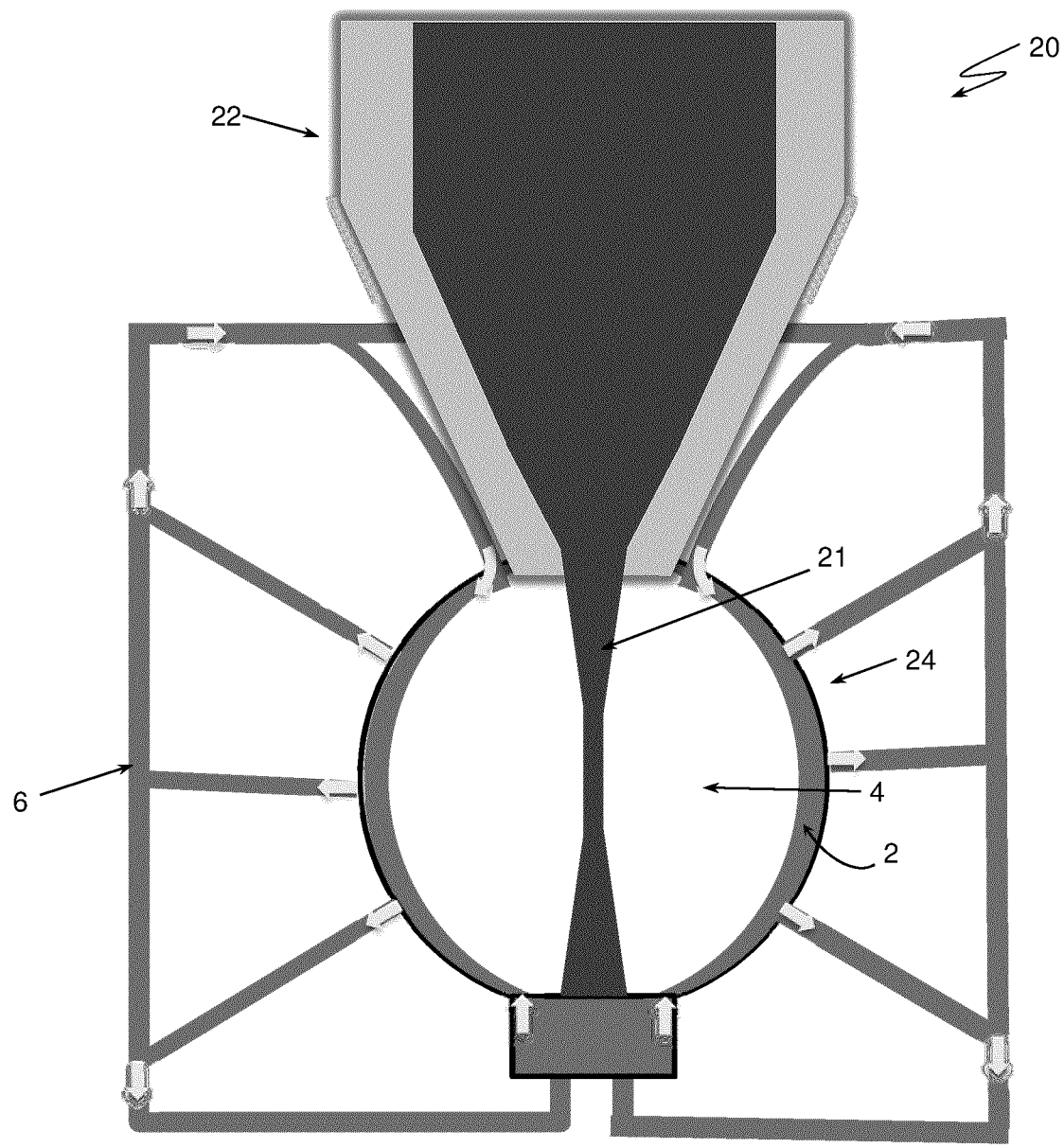
FIG. 2A is a cross-sectional schematic view of another example of a system for generating plasma and sustaining plasma's magnetic field showing a liquid liner formed in a flux conserver.

The flux conserver 24 can comprise an entrance opening 28 that is aligned with an outlet of the plasma generator 22 so that the plasma generated in the plasma generator 22 can be injected into an inner evacuated cavity of the flux conserver 24. In one implementation, the flux conserver 24 can be partially filled with liquid metal (see FIG. 2A). The liquid metal in the flux conserver 24 can be circulated, rotated or configured to flow such that it forms a liquid liner 2 that defines a wall of the inner evacuated cavity 4 For example, the liner 2 can be formed by injecting a liquid medium into the flux conserver 24. A liquid circulating system 6 can be provided to direct the flow of the liquid medium in the flux conserver 24. The circulating system 6 can comprise plurality of valves, nozzles, pipe-network and one or more pumps to get the desired flow of liquid medium in the flux conserver 24. The flow of the liquid metal in the flux conserver can be designed and configured to form a desired pre-determined shape of the liquid liner 2 so that the inner cavity 4 in which the plasma is injected is spherical, cylindrical, conical or any other desired shape. Examples of liquid liners and methods for forming evacuated cavity into liquid liners are described in U.S. Pat. Nos. 8,891,719, 8,537,958 and US patent application publication No. 20100163130. This is for illustration purposes only and any other methods and systems for forming liquid liners defining an inner cavity therein can be used without departing from the scope of the invention. In one implementation, the liner can be a solid liner, such as for example a wall of the flux conserver 24 or a solid liner attached to/coated on an inner side of the wall of the flux conserver 24.

One or more coils 27 (FIG. 2) electrically coupled to a power source (not shown) can be used to set up the initial stuffing magnetic field prior to a plasma fuel being injected into the annular plasma propagation channel 25 and prior to the current being discharged. In some embodiments, the plasma fuel can be a neutral gas, such as for example isotopes of hydrogen or helium, or any other gas or combination thereof. In other embodiments, the plasma fuel can be a partially or completely ionized gas (plasma). In some embodiments where the plasma fuel is a neutral gas or a partially ionized gas, the plasma fuel is injected and diffuses to at least partially fill the channel 25 and the power source 30 (FIG. 3) is triggered to cause a formation current pulse to flow between the central conductor 21 and the outer electrode 23 for a time period which is sufficient to ionize the gas and form the magnetized plasma.

The coils 27 can be coupled to a power source that is separate and independent from the power source 30 or the power source 30 can be configured to provide power to coils 27 without departing from the scope of the invention.

Before a plasma conduction path is established in the plasma generator 22 and due to the fact that the central conductor 21 is not electrically isolated from the flux conserver 24, the system 20 performs as an inductor and the current flows along the central conductor 21, a wall 24a of the flux conserver 24 and the outer electrode 23, instead of through the gas. Such current flow may generate a pre-existing toroidal magnetic field in the plasma generator 22 and the flux conserver 24. In order to provide a breakdown discharge between the upper central conductor 21a and the outer electrode 23, a voltage needs to be applied therein within a sufficiently short time that the current passes through the gas in a substantially radial direction and ionizes the gas, instead of flowing back along the wall of the flux conserver 24. This can be achieved by using a fast switch or multiple switches to apply a high voltage within microseconds (required time to be determined based on the size (inductance) of the central conductor 21 and the flux conserver 24 according to equation $V=LdI/dt$). For example the fast switch can be a rail gap switch which can close within nanoseconds.

Figure 3:
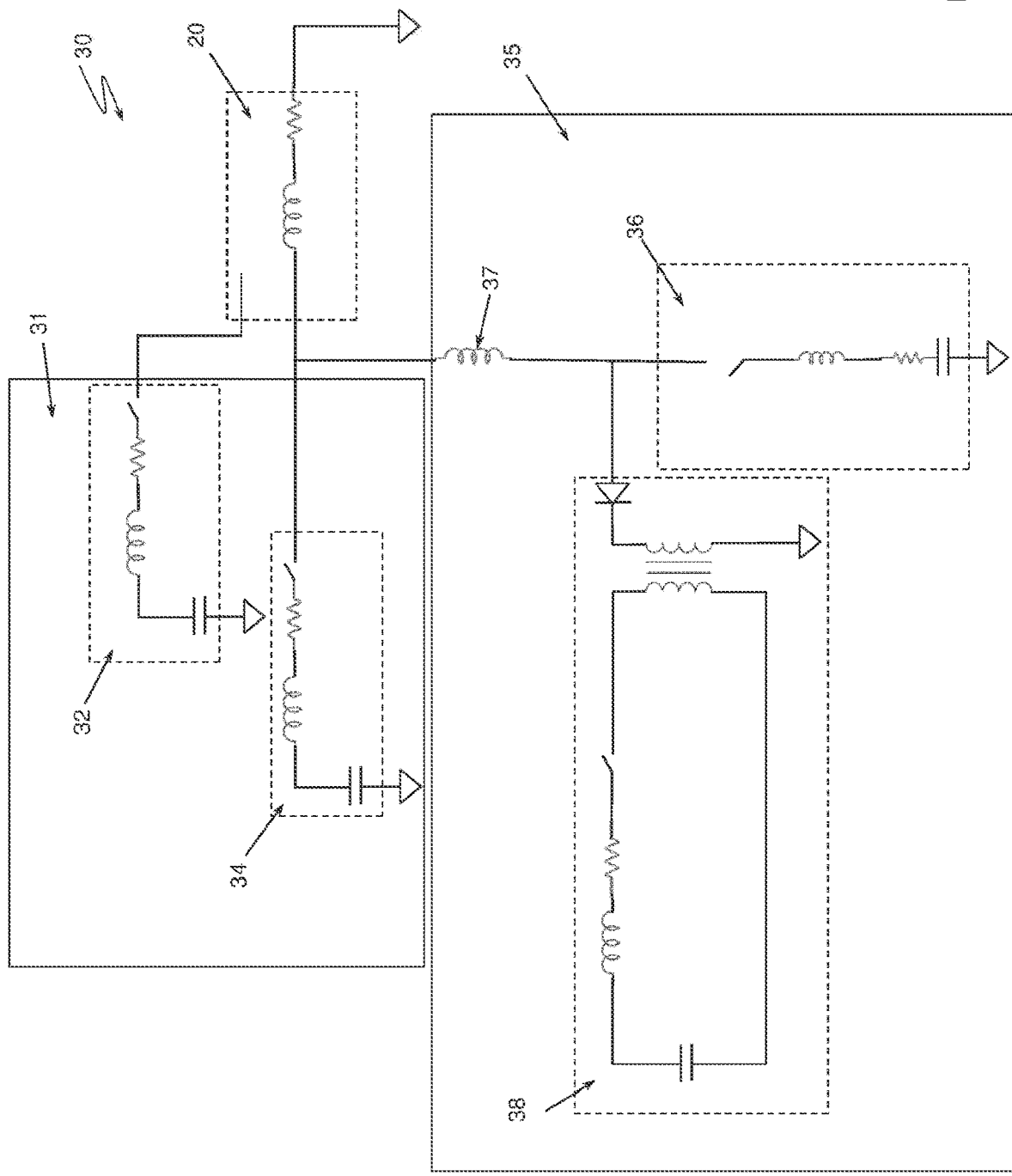
FIG. 3 is an example of a scheme of a power supply showing a formation power supply and a sustainment power supply.

FIG. 3 illustrates an example of the power supply source 30 that comprises a formation power circuit 31 to provide a formation pulse for the plasma fuel breakdown and formation of magnetized plasma, and a sustainment power circuit 35 that provides a sustainment current pulse to sustain the plasma's magnetic field for a prolonged time period. The formation power circuit 31 includes a main formation circuit 34 that comprises one or more capacitor banks and a fast high voltage switch or a system of multiple switches that are designed to rapidly apply high voltage between the central conductor 21 and the outer electrode 23 for a sufficient time period (e.g. 50 μs) to cause the breakdown discharge and ionization of the plasma fuel. Current flowing through the plasma (ionized gas) can create a plasma toroidal magnetic field that can cause motion of the plasma toward the flux conserver 24. As the plasma moves forward, it interacts with a stuffing magnetic field generated by the coils 27, such that when the advancing plasma breaks free, the magnetic field wraps around the plasma forming the poloidal magnetic field of the plasma.

FIG. 3 further shows the sustainment power circuit 35 that can include a current peaking circuit 36 and a current maintaining circuit 38. The current peaking circuit 36 and the current maintaining circuit 38 provide a current pulse to the central conductor 21 so that the current flows along the central conductor 21, the wall 24a of the flux conserver 24 and the outer electrode 23 thus generating a toroidal magnetic field (magnetic lines extending around the central conductor 21) in the plasma generator 22 and the flux conserver 24. This toroidal field can diffuse into the plasma and can increase plasma toroidal field, and by controlling the pulse profile of the sustainment current one can control plasma's toroidal field. The current peaking circuit 36 provides a fast raising current pulse that reaches a predetermined value of a current peak within a target time period. For example a pre-determined value of the current peak can be 1 MA that can be reached within 100-300 μs time period.

The current maintaining circuit 38 can then sustain such 1 MA current flow for a prolonged time (e.g. ~10 ms). A person skilled in the art would understand that the sustainment power circuits, i.e. the current peaking circuit 36 and the current maintaining circuit 38, can be designed to provide a current pulse higher or less than 1 MA which can be sustained for more or less than 10 ms. In one implementation, a single sustainment power circuit 35 can provide a fast rising sustainment current pulse of > or <1 MA that is sustained for > or <10 ms.

When a pre-determined plasma fuel is injected in the annular plasma channel 25 through the ports 26a, the formation circuit 31 is triggered to form the magnetized plasma. After the magnetized plasma is formed, the sustainment circuit 35 can be triggered to provide a toroidal field that diffuses into the plasma controlling/sustaining plasma magnetic field.

Figure 4:
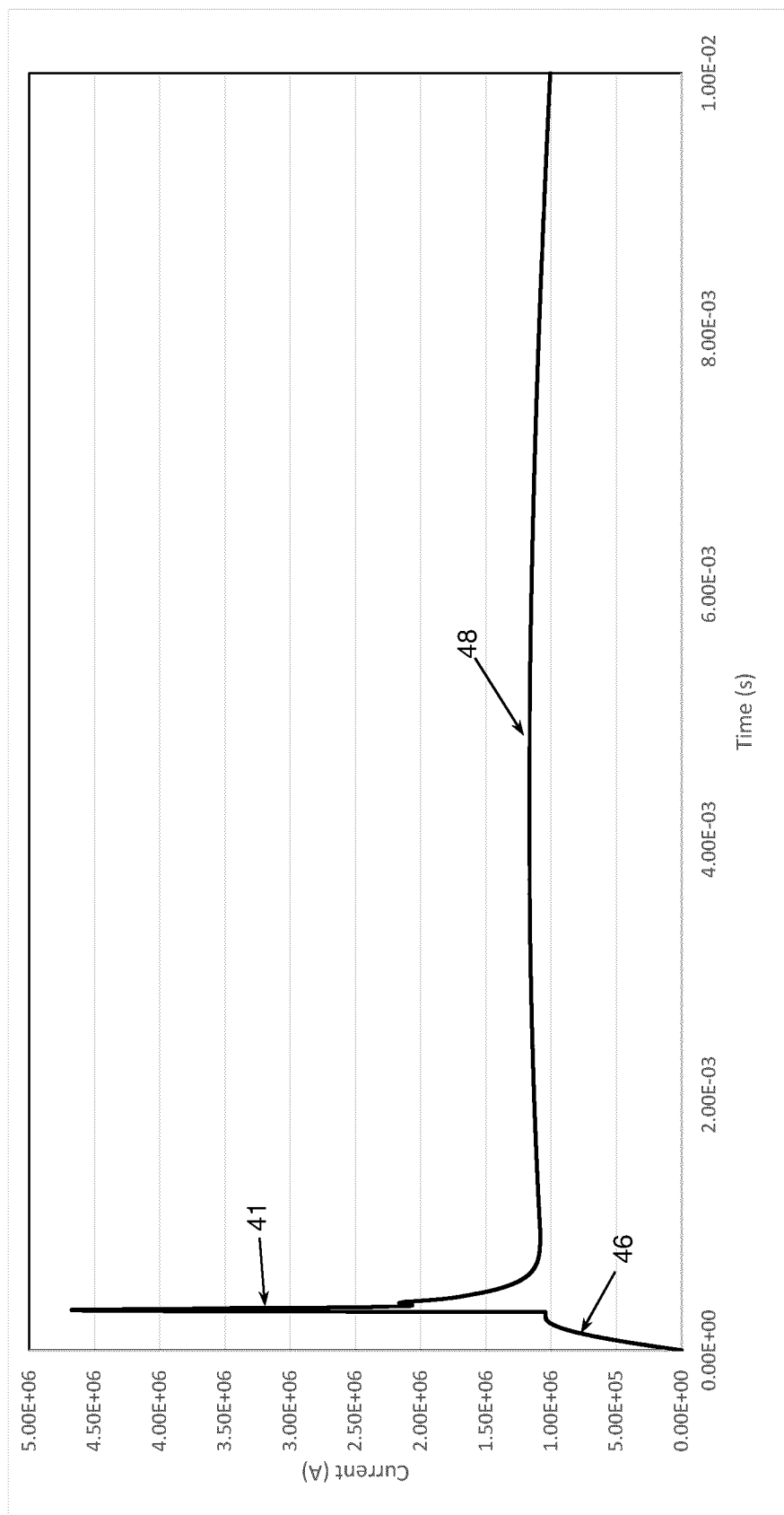
FIG. 4 is a graphical presentation of an example of a current pulse in amps (A) over time in seconds (s) generated by a formation and a sustainment power circuits.

In one implementation, the sustainment circuit 35 can be triggered before triggering time of the formation circuit 31. So, the plasma formation can occur with a pre-existing toroidal field in the plasma generator 22 and the flux conserver 24. A buffer inductor 37 can be employed to provide electrical isolation of the sustainment power circuit 35 from the formation power circuit 31. The buffer inductor's inductance value needs to be sufficient to electrically isolate the sustainment power supply 35 from the majority of the formation current pulse. For example, the inductance of the buffer inductor 37 can be 500 nH. This is exemplary value only and the inductance of the buffer 37 can be more or less than 500 nH depending on the designed plasma's parameters without departing from the scope of the invention. When the formation pulse is discharged, the buffer 37 blocks a majority of the fast formation pulse, such that current flows across the plasma fuel and forms the plasma. The current flowing through the plasma creates a plasma toroidal magnetic field that accelerates the plasma down the plasma generator 22 due to the Lorentz force. As the plasma moves toward the flux conserver 24, it will push such preexisting toroidal field, deflecting its field lines. For example, the formation current pulse can be discharged about 200-400 μs after the triggering time of the sustainment circuit 35. FIG. 4 shows a graphical presentation of one example of the current profile in the system 20. The current peaking circuit 36 is triggered first to provide a peak current of 1 MA (represented by pulse curve 46) and then, after about 100-300 μs, the current maintaining circuit 38 can be triggered at peak current to sustain such 1 MA current pulse for a prolong time of >10 ms (see curve 48). As can be noticed from the current graph of FIG. 4, the formation power circuit 31 is triggered after the sustainment power circuit 35 as represented by the formation current curve 41.

The design of the formation circuit 31 and the sustainment circuit 35 of the power supply source 30 will depend on the desired parameters of the generated plasma. For example, to generate about 300 mWb in the magnetized plasma a formation capacitor bank of about 5 MJ may be required. The current peaking circuit 36 can have 1.3 MJ capacitor bank as a power supply while the maintaining circuit 38 can have about 10 MJ capacitor bank as a power supply. This is for illustration purposes only and the circuits 36, 38 can be designed to provide and sustain currents stronger than 1 MA for more or less than 10 ms without departing from the scope of the invention. The parameters of the formation circuit 31 may also be affected by the amount of the stuffing magnetic field and the pre-existing toroidal field in the plasma generator that need to be deflected during the bubble out phase.

Figure 5:
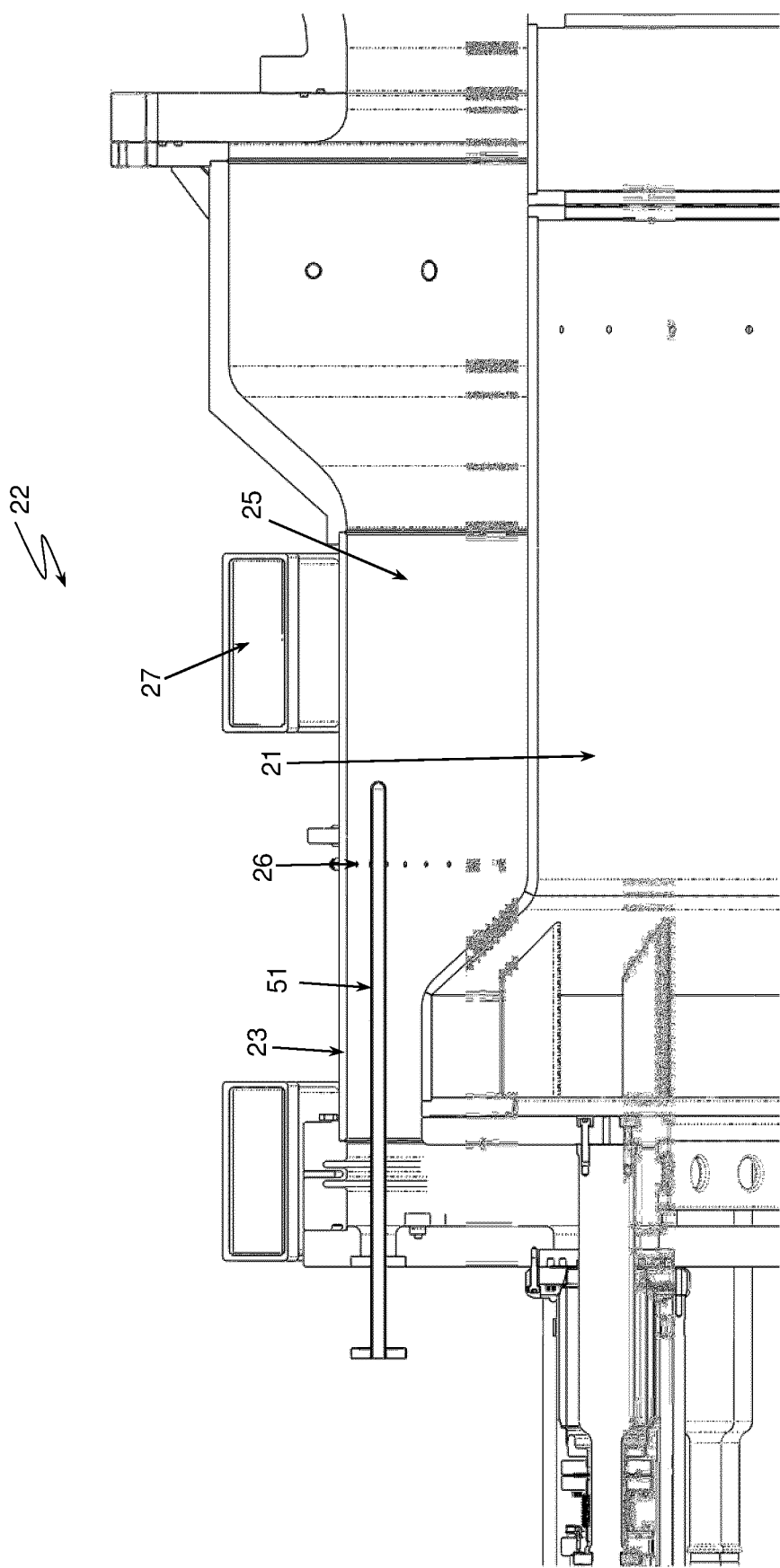
FIG. 5 is a partial cross-sectional view of another example of a system for generating plasma and sustaining plasma's magnetic field showing a trigger electrode.

A controller 39 (see FIG. 3) can be provided and pre-programmed to control the triggering time of each of the power supply circuits, as well as the operation of the fuel injector (e.g. valves 26 of the fuel injector) and the power supply for the coils 27 (stuffing magnetic field) in order to control the amount of the gas, amount of the toroidal field in the plasma generator 22 (behind and in front of the plasma) as well as the size of the formed plasma. The triggering time of the circuits 34, 36, 38 can be determined depending on the properties of the power source 30, desired parameters of the plasma and the size and geometry of the plasma system 20. Each of the circuits can have one or more suitable switches, diodes, and damping resistance (to protect the system in case of capacitor or switch failure, and to reduce electrical ringing in the power supply components). The controller 39 can comprise an input unit, an output unit, a processing unit and a memory unit and can be programmed to trigger the circuits 34, 36, 38, the valves 26 of the plasma fuel injector and the power supply of the coils 27 based on pre-programed time table stored in the memory unit or such output trigger signals can be send to the appropriate circuit/component based on a particular input signal from a number of detectors (e.g. optical probes, magnetic probe, current/voltage probes). In one implementation, a breakdown discharge to ionize the plasma fuel can be provided by one or more additional electrodes, herein referred to trigger electrodes. FIG. 5 illustrates one embodiment comprising a trigger electrode 51 to generate the breakdown discharge. The trigger electrode 51 can be positioned in the plasma propagation channel 25 and can be in electrical communication with the power source 30. For example, the formation power circuit 31 can be designed to comprise a pre-formation circuit 32 (see FIG. 3) electrically coupled to the one or more trigger electrodes 51 and the main formation circuit 34 electrically coupled to the central conductor 21. The pre-formation circuit 32 can have a pre-determined inductance and resistance and can comprise one or more capacitor banks as a power supply source. For example, the pre-formation circuit 32 can be used to provide a 10-25 kV breakdown discharge between the trigger electrode 51 and the central conductor 21. The pre-formation circuit 32 can be independent from the main formation bank 34. The polarity of the trigger electrode 51 can be opposite of the polarity of the central conductor 21 at main formation pulse in order to reduce the amount of injected gas required to achieve the electrical breakdown discharge. For example, the polarity of the trigger electrode 51 can be positive and the electrons are trapped near the central conductor 21 due to the magnetic field lines of the staffing field (electrons travel along the magnetic fields in proximity of the central conductor 21), such that when a voltage is applied to the trigger electrode 51, the breakdown occur much faster (~50 μs). Persons skilled in the art would understand that the polarity of the trigger electrode 51 can have any polarity and still achieve the breakdown discharge and ionization of the plasma fuel, or the breakdown discharge can be applied between the triggering electrode 51 and the outer electrode 23 without departing from the scope of the invention.

In one implementation, the plasma fuel can be a pre-ionized gas which can be injected into the plasma propagation channel 25 before a breakdown discharge is applied to the trigger electrode 51, so that the breakdown time can be further shorten increasing the amount of ionized gas (less neutral gas into the plasma). In one implementation, the pre-formation circuit 32 can be omitted and the main formation circuit 34 can be used to provide a current pulse to both, the trigger electrode 51 for the breakdown discharge pulse and the central conductor 21 for the formation pulse. Persons skilled in the art would understand that the applied voltage to the trigger electrode 51 to provide gas breakdown discharge can be higher or lower than 10-25 kV depending on the system dimensions and parameters as well as desired parameters of the plasma.

In the implementations where a trigger electrode 51 is used to initiate gaseous plasma fuel breakdown, the pre-formation circuit 32 is triggered before a triggering time of the main formation bank 34. For example, the pre-formation circuit 32 can be triggered about 200-300 µs after opening time of the valve(s) 26 that inject gaseous plasma fuel into the channel 25. The gaseous plasma fuel is injected into the plasma propagation channel 25 through a manifold of gas valves 26. The breakdown current pulse is delivered to the trigger electrode 51 so that the current flows from the trigger electrode 51 to the central conductor 21 (or alternatively to the outer electrode 23) through the gas and at least partially ionizes the gas forming plasma. The gas breakdown can be detected by one or more detectors (not shown) designed to detect, for example a breakdown light. For example, the detectors can be optical sensors configured to detect the light generated by the breakdown events. After gas breakdown is detected, a main formation pulse 34 is discharged to the central conductor 21 to further ionize the gas and provide the plasma toroidal field to accelerate the plasma through the stuffing magnetic field until it breaks free (bubble out phase) and is injected into the flux conserver 24. The input unit of the controller 39 can be provided to receive signal(s) from the one or more detectors, and based on such signals the output unit of controller 39 can send a signal to the power source 30 to trigger the switch of the main formation bank 34.

Figure 7:
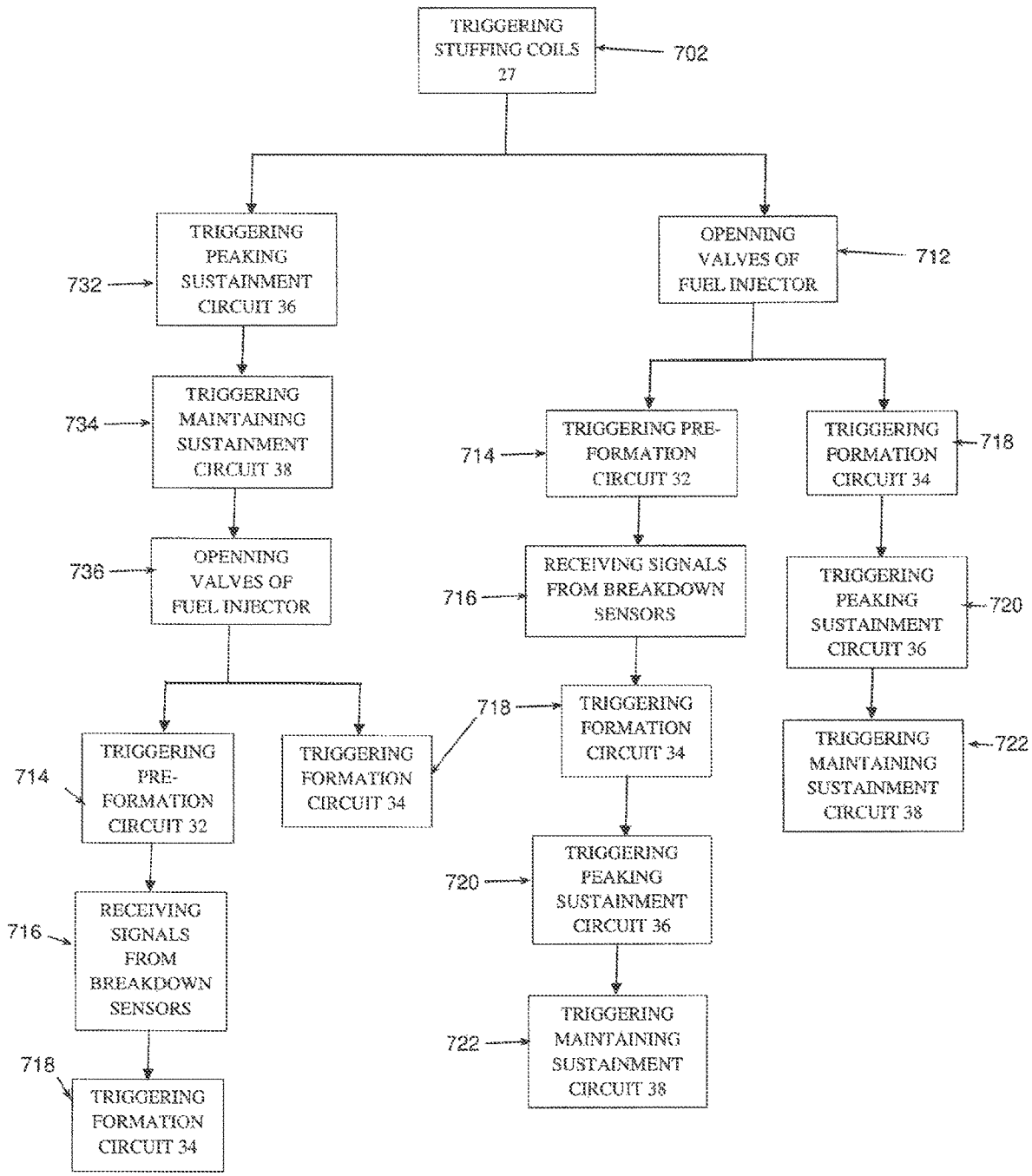
FIG. 7 is a flow chart of a method for controlling the system for generating plasma and sustaining plasma's magnetic field showing steps executed by a controller.

FIG. 7 illustrates triggering steps executed by the controller 39. As indicated by step 702, the controller first triggers the power supply of the coils 27 so that the initial stuffing field is soaked into the annular plasma propagation channel 25. In embodiments when no pre-toroidal field is required, the right stream of steps is executed by the controller 39. So, once the stuffing field is soaked in the plasma propagation channel 25, the valves 26 are opened (step 712) to inject plasma fuel into the plasma propagation channel 25. In the embodiments employing triggering electrodes 51 coupled to the pre-formation circuit 32, in step 714 the pre-formation circuit is triggered (e.g. 200-300 µs) after opening time of the valve(s) 26. At step 716, the processing unit of the controller 39 processes the signals received from the optical light sensors to determine when breakdown of the plasma fuel occurs and based on such occurrence, at step 718, the controller 39 triggers the main formation circuit 34 to form the magnetized plasma and inject such plasma into flux conserver 24. At step 720, the controller can trigger the peaking current sustainment circuit 36 at some pre-determined time (e.g. 200-300 µs) after the triggering time of the main formation circuit 34 or the peaking current sustainment circuit 36 can be triggered when the magnetic probe mounted in the wall of the flux conserver 24*a* indicates that the plasma is injected into the flux conserver 24. At step 722, the controller triggers the current maintaining circuit 38 with the delay of for example 100-300 µs after the triggering time of the peaking current sustainment circuit 36 (or once the pre-determined value of the peak current is reached as provided by the current probes). In the embodiments when no triggering electrodes 51 are employed steps 714 and 716 are omitted and formation circuit 34 is triggered at predetermined time (e.g. 200-500 µs) after the opening time of the valves 26. Steps 720 and 722 are then triggered as described here in before.

In embodiments when a pre-toroidal field is required, the left stream of steps is executed by the controller 39. So, at step 732, the controller 39 can trigger the peaking current sustainment circuit 36. The peaking current sustainment circuit 36 can be triggered at the same time as the triggering time of the coils 27 or with some time delay, such as for example 200 µs delay. After a delay of for example 100-300 µs or once the pre-determined value of the peak current is reached, as provided by the current probes, at step 734, the controller 39 triggers the current maintaining circuit 38. Then, the valves 26 are opened (step 736) and then depending whether triggering electrodes 51 are employed or not steps 714-718 are executed in a similar manner as described herein before.

Figure 6:
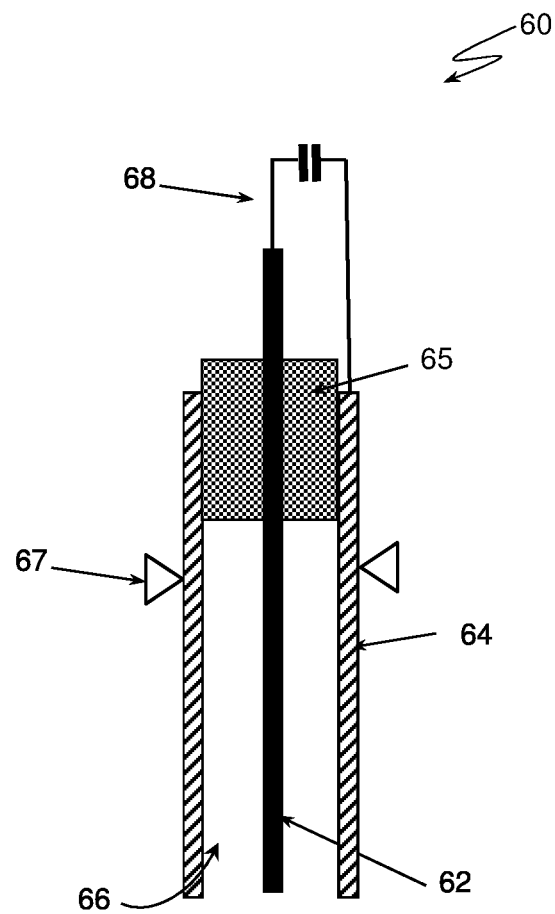
FIG. 6 is a cross-sectional schematic view of a pre-ionizer used to partially ionizes a neutral gas and inject such pre-ionized gas into a plasma generator.

Alternately, some or all of the gaseous plasma fuel can be injected in the pre-ionized state. Injecting a large number of charged particles into the annular plasma channel 25 (instead of neutral gas) can increase the probability of the ionization and can shorten the breakdown time. For example, a pre-ionizer can be installed into a fuel tube (not shown) connecting the plasma fuel source and the plasma generator 22. The pre-ionizer can be a miniature coaxial plasma gun 60 such as the one illustrated in FIG. 6. The illustrated example of the pre-ionizer 60 comprises a central electrode 62 that is positioned within a tubular body 64. It is closed at one end with an insulator 65 and the opposite end is opened forming an outlet port 66 that is in fluid communication with the ports 26 so that a pre-ionized gas formed in the pre-ionizer 60 can be injected into the plasma generator 22. Any other configurations of electrodes used in the pre-ionizer 60 or any other pre-ionization means configured to partially ionize the gas before it is injected into the plasma generator 22 can be used without departing from the scope of the invention. A pre-determined amount of gas can be injected in the body 64 through one or more valves 67. The central electrode 62 and the body 64 are electrically coupled to a pre-ionization circuit 68. When the power source applies an electrical pulse to the pre-ionizer 60, current flows across the electrode 62, through the injected gas, to the body 64 ionizing the gas. Plasma formed in the pre-ionizer 60 along with any gas that was not ionized is then accelerated by the magnetic field created by the current flowing across the plasma and is discharged through the outlet 66 and the valves 26 into the plasma generator 22. When the partially ionized gas enters the plasma generator 22, the controller 39 can trigger a formation circuit 34 to provide a current discharge between the central conductor 21 and the outer electrode 23 of the plasma generator 22.

Alternatively, the neutral gas injected into the annular plasma propagation channel 25 of the plasma generator 22 can be pre-ionized directly using any suitable pre-ionization means or techniques. For example, pre-ionization may be conducted with one or more ultraviolet (UV) light sources, such as e.g. UV lamps. The UV lamps (not shown) can be arranged around a housing of the plasma generator 22. The UV lamp can be coupled to a suitable power source to generate a UV light beam which may be directed toward the gas injection region near the gas injection port (e.g. valves' exit ports 26*a*). The housing of the plasma generator 22 may comprise one or more transparent windows, which are configured so that the UV light may pass through the window and impinge on the injected gas causing at least partial ionization of such gas. The window may be transparent to the type of energy generated by the selected energy source, e.g. UV lamp. In one implementation, the transparent windows may be configured as a lens to focus the energy generated by the lamp to the gas injection point or region (ports 26a). In other implementations, other types of energy sources (e.g. lasers, corona discharges, radio-frequency (RF) systems etc.) can be used for the excitation and pre-ionization of the injected gas directly in the plasma generator 22 or in an external pre-ionizer. Any of the mentioned systems and methods may be use to pre-ionize the gas either directly in the plasma generator 22 or the gas can be first pre-ionized in a pre-ionizer (e.g. the pre-ionizer 60) and then is injected in a partially or completely ionized state in the plasma generator 22.

Embodiments of a plasma generation system are disclosed. Any of such embodiments can be used for generation high energy density plasma suited for applications in neutron generators, nuclear fusion, nuclear waste remediation, generation of medical nucleotides, for materials research, for remote imaging of the internal structure of objects via neutron radiography and tomography, x-rays generator, etc.

While particular elements, embodiments and applications of the present disclosure have been shown and described, it will be understood, that the scope of the disclosure is not limited thereto, since modifications can be made without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The example calculations, simulations, results, graphs, values, and parameters of the embodiments described herein are intended to illustrate and not to limit the disclosed embodiments. Other embodiments can be configured and/or operated differently than the illustrative examples described herein. Indeed, the novel methods and apparatus described herein may be embodied in a variety of other forms; furthermore, various omissions, substitutions and changes in the form of the methods and systems described herein may be made.

What is claimed is:

1. A system for generating a magnetized plasma and sustaining a magnetic field of the magnetized plasma, the system comprising:
   a plasma generator for generating the magnetized plasma and comprising an outer electrode and an upper central conductor located coaxially within and spaced from the outer electrode to form an annular plasma propagation channel with an outlet,
   a fuel injector for injecting a plasma fuel into an upstream end of the annular plasma propagation channel;
   one or more coils operable to generate a magnetic field in the annular plasma propagation channel and to provide a poloidal field for the magnetized plasma;
   a flux conserver having an outer wall and a lower central conductor located coaxially within and spaced from the outer wall to define an evacuated inner cavity with an entrance in fluid communication with the outlet of the annular plasma propagation channel and through which the magnetized plasma is injected into the inner cavity, wherein one end of the lower central conductor is electrically coupled to one end of the upper central conductor and another end of the lower central conductor is electrically connected to the outer wall of the flux conserver; and
   a power supply source electrically coupled to the upper and lower central conductors such that a current flows along the upper and lower central conductors and the outer wall of the flux conserver, the power supply source comprising a formation power circuit configured to generate a formation power pulse sufficient to generate the magnetized plasma from the plasma fuel in the plasma generator and to inject the magnetized plasma into the flux conserver, and a sustainment power circuit configured to generate a sustainment current pulse along the upper and lower central conductors and the outer wall of the flux conserver sufficient to generate a toroidal magnetic field in the plasma generator and the flux conserver.

2. The system of claim 1, wherein the sustainment power circuit further comprises a buffer inductor that at least partially electrically isolates the sustainment power circuit from the formation power circuit; and the system further comprises a controller having a processing unit communicative with the formation and sustainment power circuits, and a memory having encoded thereon a program code which when executed the processing unit triggers the sustainment power circuit before the formation power circuit to form a pre-existing toroidal field in the plasma generator and the flux conserver.

3. The system of claim 1, wherein the plasma fuel is a neutral gas, and the formation power circuit comprises at least one fast high voltage switch operable to apply a voltage between the upper central conductor and the outer electrode at a value and rate sufficient to break down the neutral gas to form the magnetized plasma before the current loops around the flux conserver.

4. The system of claim 1 further comprising at least one trigger electrode positioned in the annular plasma propagation channel and electrically coupled to the formation power circuit, and wherein the formation power circuit is operable to provide a breakdown current pulse to the trigger electrode sufficient to break down the plasma fuel to form the magnetized plasma.

5. The system of claim 4, wherein the formation power circuit comprises a main formation power circuit electrically coupled to the upper central conductor and operable to provide the formation current pulse, and a pre-formation power circuit electrically coupled to the trigger electrode and operable to provide the breakdown current pulse.

6. The system of claim 1, wherein the plasma fuel is a pre-ionized gas that is injected into the upstream end of the annular plasma propagation channel.

7. The system of claim 6 further comprising a trigger electrode positioned in the annular plasma propagation channel in the vicinity of the fuel injector.

8. The system of claim 1, wherein the plasma fuel is a neutral gas, and the system further comprises a means for pre-ionization that provides an excitation energy in the annular plasma propagation channel that at least partially ionizes the neutral gas therein.

9. The system of claim 1, wherein the sustainment power circuit comprises a current peaking circuit operable to provide a fast raising current pulse that reaches a predetermined value of a current peak within a target time period, and a current maintaining power circuit configured to sustain a current flow in the system at the current peak for a predetermined time period.

10. The system of claim 1, wherein the lower central conductor is a liquid metal guide comprising a flowing liquid metal, and the upper central conductor comprises a liquid metal reservoir and a nozzle through which the liquid metal flows and forms the liquid metal guide.

11. The system of claim 10 further comprising a liquid metal catcher positioned at an end plate of the flux conserver below the nozzle; and a recirculating system with a network of conduits fluidly coupling the liquid metal catcher and the liquid metal reservoir, such that liquid metal caught in the liquid metal catcher is returned to the liquid metal reservoir.

12. The system of claim 1, wherein the flux conserver is partially filled with a liquid metal, and the system further comprises a liquid metal circulating system configured to direct a flow of the liquid metal within the flux conserver such that a liquid metal liner is formed within the evacuated inner cavity.

* * * * *